US012533308B2

United States Patent
Hong et al.

(10) Patent No.: US 12,533,308 B2
(45) Date of Patent: Jan. 27, 2026

(54) WATER-DISPERSIBLE, OIL-FREE, AND UV-BLOCKING COSMETIC COMPOSITION AND PREPARATION METHOD THEREFOR

(71) Applicant: KOLMAR KOREA CO., LTD., Jeonui-myeon Sejong (KR)

(72) Inventors: Sung Eun Hong, Seoul (KR); Young Hwa Kim, Seoul (KR); Ji Hyun Sohn, Seoul (KR); Sung Bong Kye, Seoul (KR)

(73) Assignee: KOLMAR KOREA CO., LTD., Jeonui-myeon Sejong (KR)

( * ) Notice: Subject to any disclaimer, the term of this patent is extended or adjusted under 35 U.S.C. 154(b) by 664 days.

(21) Appl. No.: 17/798,238

(22) PCT Filed: Feb. 9, 2021

(86) PCT No.: PCT/KR2021/001706
§ 371 (c)(1),
(2) Date: Aug. 8, 2022

(87) PCT Pub. No.: WO2021/162408
PCT Pub. Date: Aug. 19, 2021

(65) Prior Publication Data
US 2023/0126603 A1 Apr. 27, 2023

(30) Foreign Application Priority Data
Feb. 13, 2020 (KR) .................. 10-2020-0017825

(51) Int. Cl.
*A61K 8/49* (2006.01)
*A61K 8/34* (2006.01)
*A61K 8/41* (2006.01)
*A61K 8/46* (2006.01)
*A61Q 17/04* (2006.01)

(52) U.S. Cl.
CPC ............ *A61K 8/4946* (2013.01); *A61K 8/345* (2013.01); *A61K 8/41* (2013.01); *A61K 8/466* (2013.01); *A61K 8/496* (2013.01); *A61K 8/4966* (2013.01); *A61Q 17/04* (2013.01); *A61K 2800/48* (2013.01)

(58) Field of Classification Search
None
See application file for complete search history.

(56) References Cited

U.S. PATENT DOCUMENTS

2007/0160549 A1   7/2007  Hunt et al.

FOREIGN PATENT DOCUMENTS

| EP | 4 144 343 A1 | 3/2023 | |
|---|---|---|---|
| FR | 3 083 093 A1 | 1/2020 | |
| JP | 6598802 B2 | 10/2019 | |
| KR | 10-2019-0062937 A | 6/2019 | |
| KR | 10-2018-0103650 A | 12/2019 | |
| KR | 10-2105137 B1 | 4/2020 | |
| WO | 2016/008117 A1 | 1/2016 | |
| WO | WO-2016012586 A1 * | 1/2016 | ............... A61K 8/29 |
| WO | WO-2018013732 A1 * | 1/2018 | ........... A61K 31/215 |
| WO | 2021/162408 A1 | 8/2021 | |

OTHER PUBLICATIONS

Son, S. W., & Yeon, J. H. (2012). Mechanical properties of acrylic polymer concrete containing methacrylic acid as an additive. Construction and Building Materials, 37, 669-679. (Year: 2012).*
International Search Report and Written Opinion for PCT/KR2021/001706 mailed Jun. 2, 2021, all pages.
International Application Status Report for PCT/KR2021/001706 issued on Jul. 13, 2022.
Blog Review for L'oreal Paris of UV Perfect SPF 50 Matte & Fresh Advanced Oil-Control UV Protector retrieved from https://blog.naver.com/lily272_/221226680361 (2018) 12 pages.
Supplementary European Search Report, for EP 21 75 4191 mailed Jul. 4, 2023, 11 pages.
Kuhn D., Compositions with Beneficial Properties for Consumers, ip.com Inc., West Henrietta, NY, US, Jun. 12, 2008, XP013125294, ISSN: 1533-0001, 22 pages.
Kuhn D., Compositions with Beneficial Properties for Consumers, ip.com Inc., West Henrietta, NY, US, Apr. 15, 2015, XP013167124, ISSN: 1533-0001, 64 pages.

* cited by examiner

*Primary Examiner* — Michael G. Hartley
(74) *Attorney, Agent, or Firm* — Kilpatrick Townsend & Stockton LLP

(57) ABSTRACT

Provided are an ultraviolet (UV)-blocking cosmetic composition which is dispersed in water and is free of oil and a method of preparing the same. Since the composition does not contain oil, skin trouble may not occur, and since the composition does not include a surfactant, spreadability and feeling of use are excellent. In addition, cloudiness phenomenon or skin greasiness does not occur during use, and the UV-blocking effects are excellent.

9 Claims, 2 Drawing Sheets

WATER-DISPERSIBLE, OIL-FREE, AND UV-BLOCKING COSMETIC COMPOSITION AND PREPARATION METHOD THEREFOR

CROSS REFERENCE TO RELATED APPLICATIONS

This application is a 371 National phase filing of PCT/KR2021/001706, filed Feb. 9, 2021, which application claims priority to Korean Patent Application No. 10-2020-0017825, filed Feb. 13, 2020, the contents of which are hereby incorporated by reference in their entireties for all purposes.

TECHNICAL FIELD

The disclosure relates to an ultraviolet (UV)-blocking cosmetic composition which is dispersed in water and is free of oil and a method of preparing the same.

BACKGROUND ART

Types of general sunscreen cosmetics include oil-in-water (O/W), water-in-oil (W/O), and water-in-silicone (W/S). These UV-blocking cosmetics include oils and inorganic UV-blocking agents such as titanium dioxide, zinc oxide, and iron oxide, and/or organic UV-blocking agents, such as octyl methoxycinnamate, octyl salicylate, and octocrylene. Among these conventional UV-blocking cosmetics, cosmetics containing an organic UV-blocking agent have poor formulation stability such as precipitation during storage, and cosmetics containing an inorganic UV-blocking agent, in general, require a large amount of UV-blocking agent to obtain UV-blocking effects, and contain a large amount of surfactant to maintain the stability of the formulation, which, however, leads to poor spreadability, poor feeling of use, and frequent skin troubles.

In addition, these cosmetics cause skin troubles because oil forms an oil film on the skin and contaminants in the air are adsorbed to the oil film on the skin to block pores and inhibit the excretion of skin secretions from the body. In particular, from among oils, mineral oil, which is frequently used in cosmetics, is known to have adverse effects on the skin by itself. Accordingly, the use thereof is limited.

In addition, in the case of water-in-silicone, a separation phenomenon occurs in the formulation due to, for example, poor compatibility between silicone oil and general oil.

In response, products in which the amounts of inorganic UV-blocking agent and organic UV-blocking agent are limited, the amount of surfactant is limited, or types or mixing ratio thereof are varied, or oils are not included, are developed. However, these products are poor in the stability of the formulation, and the UV-blocking effects thereof, which is the basic effect as a UV-blocking agent, are low.

PRIOR ART LITERATURE (Patent Document 1) JP 6598802 B2

DESCRIPTION OF EMBODIMENTS

Technical Problem

One aspect of the disclosure provides an ultraviolet (UV)-blocking cosmetic composition that does not include oil.

One aspect of the disclosure provides a UV-blocking cosmetic composition that is harmless to the skin.

One aspect of the disclosure provides a UV-blocking cosmetic composition that has excellent spreadability and light feeling of use.

One aspect of the disclosure provides a UV-blocking cosmetic composition that is transparent and does not cause a cloudiness phenomenon or greasiness.

One aspect provides a UV-blocking cosmetic composition that has excellent formulation stability and excellent UV blocking effects.

Solution to Problem

To address the objectives, an aspect of the disclosure provides an ultraviolet (UV)-blocking cosmetic composition which is dispersed in water and is free of oil, the composition which includes a UV-blocking agent which is dispersed in water, is free of oil, and includes three different types of water-dispersible aromatic UV-blocking agents, which include a first UV-blocking agent, a second UV-blocking agent, and a third UV-blocking agent.

Advantageous Effects of Disclosure

An ultraviolet (UV)-blocking cosmetic composition which is dispersed in water and is free of oil, according to an aspect of the disclosure, does not cause skin trouble due to the absence of oil and surfactant, and has excellent spreadability and feeling of use. In addition, the formulation stability is excellent, during use, cloudiness phenomenon or skin greasiness does not occur, and the UV blocking effect is excellent.

BEST MODE

Figure 1:
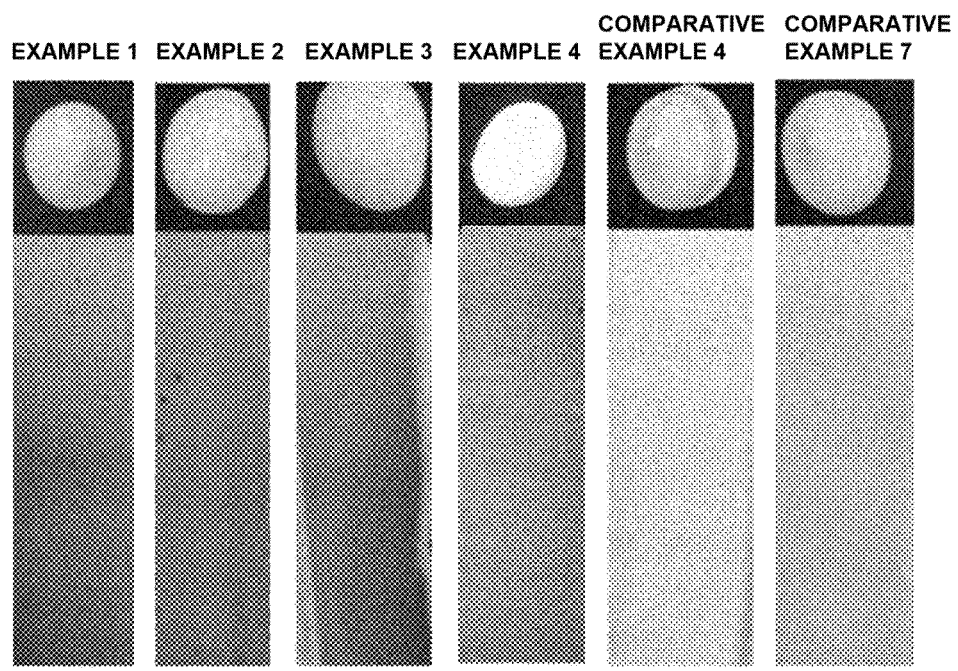
FIG. 1 show images showing the transparency of Examples 1 to 3 and Comparative Examples 4 and 7.

Hereinafter, each feature will be described in more detail, but this is only an example, and the scope of the disclosure is not limited by the following description.

Terms or words used in the specification and claims of the disclosure are not to be construed as limited in the ordinary or dictionary meanings thereof, and based on the principle that inventors of the disclosure can appropriately define the concept of the terms to best describe the disclosure, the terms or words should be interpreted as having meaning and concept consistent with the technical idea of the disclosure.

Throughout the specification of the disclosure, when a portion "includes" a component, it means that other components may be further included, rather than excluding other components, unless otherwise stated.

An ultraviolet (UV)-blocking cosmetic composition which is dispersed in water and is free of oil, according to an aspect of the disclosure, includes a UV-blocking agent dispersed in water, is free of oil, and includes three kinds of water-dispersible aromatic UV-blocking agents which are different from each other, wherein the three kinds of water-dispersible aromatic UV-blocking agents includes a first UV-blocking agent, a second UV-blocking agent, and a third UV-blocking agent.

The term "oil-free or free of oil" used herein may refer to a case in which oils are not included in the composition.

Expressions "first", "second", "third", and "nth" used herein are only for distinguishing one component from another component, and do not mean the order or importance of each component.

In the above aspect, the first UV-blocking agent may include phenylbenzimidazole sulfonic acid, and the second UV-blocking agent may include terephthalylidene dicamphor sulfonic acid. In addition, the third UV-blocking agent may include methylene bis-benzotriazolyl tetramethylbutylphenol or tris-biphenyl triazine.

In one aspect, when the composition includes all of the first UV-blocking agent, the second UV-blocking agent and the third UV-blocking agent, the composition has excellent spreadability (ease of application, uniformity of application) and convenience of use, and has excellent UV-blocking effects, and secures a stable formulation.

In one aspect, the first UV-blocking agent may be included in an amount of 1 wt % to 5 wt % based on the total weight of the composition. The first UV-blocking agent may be included in an amount of 1 wt % to 4 wt %, 1 wt % to 3.5 wt %, 1.5 wt % to 3.5 wt %, or 2 wt % to 3 wt %, based on the total weight of the composition.

In one aspect, the second UV-blocking agent may be included in an amount of 5 wt % to 10 wt % based on the total weight of the composition. The second UV-blocking agent may be included in an amount of 6 wt % to 10 wt %, 6.5 wt % to 10 wt %, 6.5 wt % to 9.5 wt %, or 7 wt % to 9 wt %, based on the total weight of the composition.

In addition, the third UV-blocking agent may be included in an amount of 1 wt % to 10 wt % based on the total weight of the composition. The third UV-blocking agent may be included in an amount of 2 wt % to 9 wt %, 3 wt % to 7 wt %, or 4 wt % to 6 wt %, based on the total weight of the composition.

When the first UV-blocking agent, second UV-blocking agent, and third UV-blocking agent are included in the same amounts as above, spreadability (ease of application, uniformity of application) and convenience of use of the UV-blocking cosmetic composition are excellent, and UV-blocking effects may be excellent.

In one aspect, the composition may further include one or more of a thickener, a polyol, water, and a pH adjusting agent.

In an embodiment, the thickener may include at least one of a carbomer and an acrylate/$C_{10-30}$ alkyl acrylate crosspolymer, but is not limited thereto.

The polyol may include at least one of propanediol and hexanediol, but is not limited thereto.

The pH adjusting agent may include tromethamine, but is not limited thereto.

In one aspect, the thickener may be included in an amount of 0.5 wt % to 1 wt % based on the total weight of the composition. In an embodiment, the thickener may be included in an amount of 0.6 wt % to 0.9 wt %, or 0.3 wt % to 0.8 wt %, based on the total weight of the composition.

In an embodiment, the carbomer may be included in an amount of 0.01 wt % to 1 wt %, 0.05 wt % to 0.7 wt %, or 0.1 wt % to 0.5 wt %, based on the total weight of the composition.

In addition, the acrylate/$C_{10-30}$ alkyl acrylate crosspolymer may be included in an amount of 0.1 wt % to 0.8 wt %, 0.2 wt % to 0.7 wt %, or 0.3 wt % to 0.6 wt %, based on the total weight of the composition.

In addition, the polyol may be included in an amount of 10 wt % to 20 wt % based on the total weight of the composition.

In an embodiment, the polyol may be included in an amount of 12 wt % to 18 wt %, or 13 wt % to 17 wt %, based on the total weight of the composition.

In an embodiment, the propanediol may be included in an amount of 3 wt % to 7 wt %, or 4 wt % to 6 wt %.

In addition, the hexanediol may be included in an amount of 0.5 wt % to 3 wt %, 1 wt % to 2.5 wt %, or 1 wt % to 2 wt %, based on the total weight of the composition.

In addition, the water may be included in the balance amount in the composition.

An aspect of the disclosure provides a method of preparing an ultraviolet (UV)-blocking cosmetic composition which is dispersed in water and is free of oil, the method including mixing: a first phase including methylene bis-benzotriazolyl tetramethylbutylphenol or tris-biphenyl triazine; a second phase including phenylbenzimidazole sulfonic acid; and a third phase including terephthalylidene dicamphor sulfonic acid.

The first phase may include: a polyol; a thickener; methylene bis-benzotriazolyl tetramethylbutylphenol or tris-biphenyl triazine; and water.

In this case, the polyol may include propanediol, and the thickener may include a carbomer and an acrylate/$C_{10-30}$ alkyl acrylate crosspolymer.

The polyol included in the first phase may be included in an amount of 2 wt % to 7 wt %, 3 wt % to 7 wt %, or 4 wt % to 6 wt %, based on the total weight of the composition.

In an embodiment, the carbomer included in the first phase may be included in an amount of 0.01 wt % to 1 wt %, 0.05 wt % to 0.7 wt %, or 0.1 wt % to 0.5 wt %, based on the total weight of the composition.

In addition, the acrylate/$C_{10-30}$ alkyl acrylate crosspolymer included in the first phase may be included in an amount of 0.1 wt % to 0.8 wt %, 0.2 wt % to 0.7 wt %, or 0.3 wt % to 0.6 wt %, based on the total weight of the composition.

In addition, methylene bis-benzotriazolyl tetramethylbutylphenol included in the first phase may be included in an amount of 1 wt % to 10 wt %, 2 wt % to 9 wt %, 3 wt % to 7 wt %, or 4 wt % to 6 wt %, based on the total weight of the composition.

In addition, tris-biphenyl triazine included in the first phase may be included in an amount of 1 wt % to 10 wt %, 2 wt % to 9 wt %, 3 wt % to 7 wt %, or 4 wt % to 6 wt %, based on the total weight of the composition.

The methylene bis-benzotriazolyl tetramethylbutylphenol and tris-biphenyl triazine may be optionally included.

In addition, the pH adjusting agent included in the second phase may include tromethamine, and tromethamine included in the second phase may be included in an amount of 0.5 wt % to 2 wt %, or 1 wt % to 1.5 wt %, based on the total weight of the composition.

In addition, water included in the second phase may be included in an amount of 7 wt % to 13 wt %, 8 wt % to 12 wt %, or 9 wt % to 11 wt %, based on the total weight of the composition.

In addition, the phenylbenzimidazole sulfonic acid contained in the second phase may be included in an amount of 1 wt % to 5 wt %, 1 wt % to 4 wt %, 1 wt % to 3.5 wt %, 1.5 wt % to 3.5 wt %, or 2 wt % to 3 wt %, based on the total weight of the composition.

In addition, the pH adjusting agent included in the third phase may include tromethamine, and the tromethamine included in the third phase may be included in an amount of 1 wt % to 3 wt %, or 2 wt % to 2.5, based on the total weight of the composition.

In addition, terephthalylidene dicamphor sulfonic acid included in the third phase may be included in an amount of 5 wt % to 10 wt %, 6 wt % to 10 wt %, 6.5 wt % to 10 wt %, 6.5 wt % to 9.5 wt %, or 7 wt % to 9 wt %, based on the total weight of the composition.

In addition, the water included in the third phase may be included in an amount of 5 wt % to 10 wt %, 5 wt % to 9 wt %, or 6 wt % to 8 wt %, based on the total weight of the composition.

In one aspect, the viscosity of the composition may be greater than about 40000 cps to about 60000 cps or less. Specifically, the viscosity of the composition may be from 50000 cps to 60000 cps or 53000 cps to 57000 cps.

In one aspect, the formulation of the composition may be a cream, a lotion, a gel, cosmetic water, etc. In an embodiment, the formulation of the composition may be a gel.

When the viscosity of the composition satisfies the ranges, a stable gel formulation may be obtained.

In one aspect, the mixing of the method may include: a first mixing of mixing the first phase with the second phase; and a second mixing of mixing a mixture including the first phase and the second phase with the third phase.

In addition, the first mixing may include mixing the first phase with a pH adjusting agent and then mixing the resultant mixture with the second phase.

The pH adjusting agent may include tromethamine, which is included in an amount of 0.01 wt % to 1 wt %, 0.05 wt % to 1 wt %, 0.1 wt % to 1 wt %, 0.3 wt % to 1 wt %, or 0.4 wt % to 0.6 wt %, based on the total weight of the composition.

In addition, the second mixing may include mixing the mixture including the first phase and the second phase with polyol, and then mixing the resultant mixture with the third phase.

Polyol mixed in the mixture including the first phase and the second phase may include hexanediol, and the hexanediol may be mixed in an amount of 0.7 wt % to 2 wt %, 1 wt % to 2 wt %, or 1.3 wt % to 1.7 wt %, based on the total weight of the composition.

In an embodiment, the method may further include mixing, with alcohol, the mixture including the first phase, the second phase, polyol, the third phase, and the pH adjusting agent, wherein the mixture is prepared by mixing, with polyol, the mixture including the first phase, the second phase, and the pH adjusting agent, and then mixing the resultant mixture with the third phase and then the pH adjusting agent, wherein the mixture including the first phase, the second phase, and the pH adjusting agent is prepared by mixing, with the second phase, the mixture prepared by mixing the first phase with the pH adjusting agent.

The alcohol mixed in the mixture including the first phase, second phase, polyol, third phase, and pH adjusting agent may be mixed in an amount of 5 wt % to 13 wt %, or 6 wt % to 10 wt %, based on the total weight of the composition. The concentration of the alcohol may be 10% (v/v) to 90% (v/v), 30% (v/v) to 80% (v/v), or 40% (v/v) to 60% (v/v).

In the method, the first phase, the second phase, and the third phase may include a case in which each of the first phase, the second phase, and the third phase is mixed and dispersed before mixing.

In addition, the mixing method according to the disclosure provides a UV-blocking cosmetic composition having a stable formulation.

In addition, the mixing components to be added are not limited thereto, and any component can be mixed within the objective and effect of the disclosure.

Hereinafter, the disclosure will be described in more detail through Preparation Examples and Examples. These Preparation Examples and Examples are only for illustrating the disclosure, and it will be apparent to those of ordinary skill in the art that the scope of the disclosure is not to be construed as being limited by these Examples.

PREPARATION EXAMPLES

UV-blocking cosmetic compositions were prepared using the components shown in Tables 1 to 3 below.

TABLE 1

| Phase | Name of Source Material | Example 1 | Example 2 | Example 3 | Example 4 | Comparative Example 1 | Comparative Example 2 | Comparative Example 3 | Comparative Example 4 |
|---|---|---|---|---|---|---|---|---|---|
| A | Purified water | To 100 | To 100 | To 100 | To 100 | To 100 | To 100 | To 100 | To 100 |
|   | Propanediol | 5.00 | 5.00 | 5.00 | 5.00 | 5.00 | 5.00 | 5.00 | 5.00 |
|   | Carbomer | 0.2 | 0.2 | 0.2 | 0.2 | 0.2 | 0.2 | 0.2 | 0.2 |
|   | Acrylate/$C_{10-30}$ alkylacrylate crosspolymer | 0.44 | 0.44 | 0.44 | 0.44 | 0.44 | 0.44 | 0.44 | 0.44 |
|   | Methylene bis-benzotriazolyl tetramethylbutylphenol | 5.00 | 7.00 | 2.00 | — | — | 5.00 | 10.5 | 5.00 |
|   | Trisbiphenyl triazine | — | — | — | 5.00 | — | — | — | — |
| B | Phenylbenzimidazole sulfonic acid | 2.50 | 5.00 | 1.50 | 2.50 | 5.00 | — | 5.0 | 2.50 |
|   | Purified water | 10.00 | 10.00 | 10.00 | 10.00 | 10.00 | 10.00 | 10.00 | 10.00 |
|   | Tromethamine | 1.25 | 1.25 | 1.25 | 1.25 | 2.5 | 1.25 | 1.25 | 1.25 |
| C | 1,2 Hexanediol | 1.50 | 1.50 | 1.50 | 1.50 | 1.50 | 1.50 | 1.50 | 1.50 |
| D | Polyglyceryl-4 diisostearate/polyhydroxystearate/sebecate | — | — | — | — | — | — | — | 2.5 |
| E | Dibutyl adipate | — | — | — | — | — | — | — | 5.00 |
|   | Ethylhexyltriazone | — | — | — | — | — | — | — | 1.5 |
| F | Purified water | 7.00 | 7.00 | 7.00 | 7.00 | 7.00 | 7.00 | 7.00 | 7.00 |
|   | Tromethamine | 1.75 | 1.75 | 1.75 | 1.75 | 1.75 | 1.75 | 1.75 | 1.75 |
|   | Terephthalylidene dicamphor sulfonic acid | 8.00 | 10.00 | 5.00 | 8.00 | 10.5 | 10.5 | — | 8.00 |
| G | Purified water | 5.00 | 5.00 | 5.00 | 5.00 | 5.00 | 5.00 | 5.00 | 5.00 |
|   | Tromethamine | 0.67 | 0.67 | 0.67 | 0.67 | 2.23 | 2.23 | 2.5 | 0.67 |
| H | Alcohol 50% | 8.00 | 8.00 | 8.00 | 8.00 | 8.00 | 8.00 | 8.00 | 8.00 |

TABLE 2

| Phase | Name of Source Material | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|
| A | Purified water | To 100 | To 100 | To 100 | To 100 | To 100 | To 100 | To 100 | To 100 |
|   | Propanediol | 5.00 | 5.00 | 5.00 | 5.00 | 5.00 | 5.00 | 5.00 | 5.00 |
|   | Carbomer | 0.2 | 0.2 | 0.2 | 0.2 | 0.2 | 0.2 | 0.2 | 0.2 |
|   | Acrylate/$C_{10-30}$ alkylacrylate crosspolymer | 0.44 | 0.44 | 0.44 | 0.44 | 0.44 | 0.44 | 0.44 | 0.44 |
|   | Methylene bis-benzotriazolyl tetramethylbutylphenol | 5.00 | 5.00 | 5.00 | 11.00 | 0.5 | — | 5.00 | 5.00 |
|   | Trisbiphenyl triazine | — | — | — | — | — | — | — | — |
| B | Phenylbenzimidazole sulfonic acid | 2.50 | 2.50 | 2.50 | 6.0 | 0.5 | 2.50 | — | 2.50 |
|   | Purified water | 10.00 | 10.00 | 10.00 | 10.00 | 10.00 | 10.00 | 10.00 | 10.00 |
|   | Tromethamine | 1.25 | 1.25 | 1.25 | 1.25 | 1.25 | 1.25 | 1.25 | 1.25 |
| C | 1,2 Hexanediol | 1.50 | 1.50 | 1.50 | 1.50 | 1.50 | 1.50 | 1.50 | 1.50 |
| D | Polyglyceryl-4 diisostearate/polyhydroxystearate/sebecate | — | 2.5 | 2.5 | — | — | — | — | — |
| E | Dibutyl adipate | 5.00 | — | 5.00 | — | — | — | — | — |
|   | Ethylhexyltriazone | 1.5 | 1.5 | — | — | — | 1.5 | 1.5 | 1.5 |
| F | Purified water | 7.00 | 7.00 | 7.00 | 7.00 | 7.00 | 7.00 | 7.00 | 7.00 |
|   | Tromethamine | 1.75 | 1.75 | 1.75 | 1.75 | 1.75 | 1.75 | 1.75 | 1.75 |
|   | Terephthalylidene dicamphor sulfonic acid | 8.00 | 8.00 | 8.00 | 11.00 | 4.00 | 8.00 | 8.00 | — |
| G | Purified water | 5.00 | 5.00 | 5.00 | 5.00 | 5.00 | 5.00 | 5.00 | 5.00 |
|   | Tromethamine | 0.67 | 0.67 | 0.67 | 0.67 | 0.67 | 0.67 | 0.67 | 0.67 |
| H | Alcohol 50% | 8.00 | 8.00 | 8.00 | 8.00 | 8.00 | 8.00 | 8.00 | 8.00 |

TABLE 3

| Phase | Name of Source Material | Comparative Example 13 | Comparative Example 14 | Comparative Example 15 | Comparative Example 16 | Comparative Example 17 | Comparative Example 18 |
|---|---|---|---|---|---|---|---|
| A | Purified water | To 100 | To 100 | To 100 | To 100 | To 100 | To 100 |
|   | Propanediol | 5.00 | 5.00 | 5.00 | 5.00 | 5.00 | 5.00 |
|   | Carbomer | 0.2 | 0.2 | 0.2 | 0.2 | 0.2 | 0.2 |
|   | Acrylate/$C_{10-30}$ alkylacrylate crosspolymer | 0.44 | 0.44 | 0.44 | 0.44 | 0.44 | 0.44 |
|   | Methylene bis-benzotriazolyl tetramethylbutylphenol | 1.00 | 10.00 | 5.00 | 5.00 | 5.00 | 5.00 |
|   | Trisbiphenyl triazine | — | — | — | — | — | — |
| B | Phenylbenzimidazole sulfonic acid | 2.50 | 2.50 | 1.0 | 5.00 | 2.50 | 2.50 |
|   | Purified water | 10.00 | 10.00 | 10.00 | 10.00 | 10.00 | 10.00 |
|   | Tromethamine | 1.25 | 1.25 | 0.5 | 2.5 | 1.25 | 1.25 |
| C | 1,2 Hexanediol | 1.50 | 1.50 | 1.50 | 1.50 | 1.50 | 1.50 |
| D | Polyglyceryl-4 diisostearate/polyhydroxystearate/sebecate | — | — | — | — | — | — |
| E | Dibutyl adipate | — | — | — | — | — | — |
|   | Ethylhexyltriazone | — | — | — | — | — | — |
| F | Purified water | 7.00 | 7.00 | 7.00 | 7.00 | 7.00 | 7.00 |
|   | Tromethamine | 1.75 | 1.75 | 1.75 | 1.75 | 1.09 | 2.18 |
|   | Terephthalylidene dicamphor sulfonic acid | 8.00 | 8.00 | 8.00 | 8.00 | 5.00 | 10.0 |
| G | Purified water | 5.00 | 5.00 | 5.00 | 5.00 | 5.00 | 5.00 |
|   | Tromethamine | 0.67 | 0.67 | 0.67 | 0.67 | 0.67 | 0.67 |
| H | Alcohol 50% | 8.00 | 8.00 | 8.00 | 8.00 | 8.00 | 8.00 |

In detail, each of the phase A to phase H was uniformly dispersed at room temperature, and phase B and phase F were each dispersed before mixing with other phases, and then phase G was put in phase A and the resultant mixture was mixed. Then, phase B, phase C, and phase F were sequentially added and sufficiently dispersed, and then phase D, phase E and phase H (50% (v/v) ethanol) were sequentially added and mixed and uniformly dispersed, thereby preparing a cosmetics composition.

When phase B is not dispersed in advance, the component may precipitate, and when phase F is not dispersed in advance, titer may decrease. In addition, when other phases other than the G phase are first mixed with the A phase, the formulation collapses due to the pH destabilization of the composition.

Experimental Example 1

Measurement of UV Protection Index

The sun protection factor (SPF) was measured by applying a sample on polymethyl methacrylate (PMMA 'HELIO PLATE HD6) plate, according to the test specifications of 'Method for the in vitro determination of UVA protection provided by sunscreen products' of COLIPA (European Cosmetics Association). UV-blocking effects (SPF) were calculated according to Equation 1. The measurement results are shown in Table 4.

$$SPF = \frac{\int_{290}^{400} S(\lambda)s_{er}(\lambda)d\lambda}{\int_{290}^{400} S(\lambda)s_{er}(\lambda)T(\lambda)d\lambda}$$ [Equation 1]

TABLE 4

| Evaluation Target | SPF |
|---|---|
| Example 1 | 49.5 |
| Example 2 | 33.2 |
| Example 3 | 32.5 |
| Example 4 | 45.2 |
| Comparative Example 1 | 21.3 |
| Comparative Example 2 | 15.5 |
| Comparative Example 3 | 12.1 |
| Comparative Example 4 | 32.2 |
| Comparative Example 5 | — |
| Comparative Example 6 | — |
| Comparative Example 7 | 11.3 |
| Comparative Example 8 | 10.5 |
| Comparative Example 9 | 5.5 |
| Comparative Example 10 | 13.5 |
| Comparative Example 11 | 21.1 |
| Comparative Example 12 | 15.6 |
| Comparative Example 13 | 24.3 |
| Comparative Example 14 | 20.1 |
| Comparative Example 15 | 18.5 |
| Comparative Example 16 | 22.5 |
| Comparative Example 17 | 21.5 |
| Comparative Example 18 | 22.1 |

As a result, it was confirmed that when phenylbenzimidazole sulfonic acid, terephthalylidene dicamphor sulfonic acid, and methylene bis-benzotriazolyl tetramethylbutyiphenol (or tris-biphenyl triazine) are included, better UV-blocking effects were obtained, compared to cases in which any one of these three is not included.

In addition, when any one of the three water-dispersible aromatic UV-blocking agents was included in a small amount or in an excessive amount, the UV-blocking effects were lowered.

In addition, even when a surfactant was included, an organic UV-blocking agent was included, or an oil was included, UV-blocking effects were reduced.

Experimental Example 2

Viscosity Measurement, and Confirmation of Formulation Formation, and Formulation Stability Experimental Example 2-1

Confirmation of Formation of Viscosity and Formulation

Regarding the compositions of Examples 1 to 4 and Comparative Examples 1 to 18, the viscosity thereof was measured by rotating under resistance in the sample solution by using a BH (TOKIMEC) viscometer. At this time, the deflection of the spring was measured with an analog scale on the dial.

The results are as shown in Table 5 below.

TABLE 5

| Evaluation Target | Viscosity (cps) | Formulation Formation |
|---|---|---|
| Example 1 | 55000 | ○ |
| Example 2 | 50000 | ○ |
| Example 3 | 45000 | ○ |
| Example 4 | 53000 | ○ |
| Comparative Example 1 | 31000 | ○ |
| Comparative Example 2 | 66000 | ○ |
| Comparative Example 3 | 29000 | ○ |
| Comparative Example 4 | 25000 | ○ |
| Comparative Example 5 | — | X |
| Comparative Example 6 | — | X |
| Comparative Example 7 | 38000 | ○ |
| Comparative Example 8 | 65000 | ○ |
| Comparative Example 9 | 70000 | ○ |
| Comparative Example 10 | 77000 | ○ |
| Comparative Example 11 | 68000 | ○ |
| Comparative Example 12 | 71000 | ○ |
| Comparative Example 13 | 51000 | ○ |
| Comparative Example 14 | 48000 | ○ |
| Comparative Example 15 | 50000 | ○ |
| Comparative Example 16 | 45000 | ○ |
| Comparative Example 17 | 42000 | ○ |
| Comparative Example 18 | 45000 | ○ |

○: Formulation formed,
X: Formulation not formed

As a result, in the cases of compositions prepared according to the mixing described in Comparative Examples, except for Examples, the viscosity of about 40,000 cps to about 60,000 cps, which is a viscosity corresponding to a gel formulation, was not obtained. In particular, in the cases of Comparative Example 5 and Comparative Example 6, the formulation was not formed.

Experimental Example 2-2

Evaluation of Formulation Stability

The formulation stability (45° C., left for 1 month) of each of the cosmetic compositions of Example 1 to Example 4, Comparative Example 1 to Comparative Example 4 was evaluated, and the evaluation results are shown in Table 6. Comparative Example 5 and Comparative Example 6, which were confirmed to not form a formulation in Experimental Example 2-1, were excluded from the experiment.

○: Layer separation, no decrease in viscosity

◐: Layer separation and decrease in viscosity occurred, but a stable formulation was restored when shaking 1 to 3 times was repeated.

●: Layer separation and decrease in viscosity occurred, and a stable formulation was not restored even when shaking 1 to 3 times was repeated.

TABLE 6

| Evaluation Target | Formulation Stability | Viscosity (cps) |
|---|---|---|
| Example 1 | ○ | 55000 |
| Example 2 | ○ | 50000 |
| Example 3 | ○ | 45000 |
| Example 4 | ○ | 52000 |
| Comparative Example 1 | ◐ | 27000 |
| Comparative Example 2 | ● | 35000 |
| Comparative Example 3 | ◐ | 30000 |

TABLE 6-continued

| Evaluation Target | Formulation Stability | Viscosity (cps) |
|---|---|---|
| Comparative Example 4 | ◐ | 30000 |
| Comparative Example 7 | ● | 25000 |
| Comparative Example 8 | ◐ | 20000 |
| Comparative Example 9 | ◐ | 15000 |
| Comparative Example 10 | ● | 35000 |
| Comparative Example 11 | ◐ | 42000 |
| Comparative Example 12 | ◐ | 53000 |
| Comparative Example 13 | ◐ | 45000 |
| Comparative Example 14 | ◐ | 30000 |
| Comparative Example 15 | ◐ | 45000 |
| Comparative Example 16 | ◐ | 37000 |
| Comparative Example 17 | ● | 35000 |
| Comparative Example 18 | ◐ | 30000 |

As a result, it was confirmed that in the cases where any one of three water-dispersible aromatic UV-blocking agents of phenylbenzimidazole sulfonic acid, terephthalylidene dicamphor sulfonic acid, and methylene bis-benzotriazolyl tetramethylbutylphenol (or tris-biphenyl triazine) is not included, or even any one of three water-dispersible aromatic UV-blocking agents is included in a small amount or in an excessive amount, when a surfactant is included, or an organic UV-blocking agent is included, or oil is included, although the viscosity corresponding to the gel formulation was obtained at the time of manufacture, the viscosity was decreased during storage, resulting in a substantial decrease in the storage properties.

Experimental Example 3

Sensory Evaluation

The compositions of Example 1 to Example 4, Comparative Example 1 to Comparative Example 4, and Comparative Example 7 to Comparative Example 18 prepared in Preparation Examples were evaluated in terms of ease of application, uniformity, and ease of use when applied by hand. Comparative Example 5 and Comparative Example 6, which were confirmed to not form a formulation in Experimental Example 2-1, were excluded from the experiment.

When applying to 10 participants for evaluation, the difference in feeling after application was judged on a 10-point scale, and the results were averaged and the obtained average is shown in Table 6. Sensory evaluation was performed with three items: ease of application, uniformity of application, and convenience of use. A higher score means better properties in terms of ease of application, uniformity of application, and convenience of use.

TABLE 7

| Evaluation Target | Ease of Application | Uniformity of Application | Convenience of Use | Total (Preference) |
|---|---|---|---|---|
| Example 1 | 8.5 | 7.5 | 9.1 | 25.1 |
| Example 2 | 6.9 | 5.5 | 8.5 | 20.9 |
| Example 3 | 5.3 | 4.9 | 7.3 | 17.5 |
| Example 4 | 8.6 | 7.1 | 9.0 | 24.7 |
| Comparative Example 1 | 3.2 | 2.2 | 5.5 | 10.9 |
| Comparative Example 2 | 4.9 | 1.5 | 4.6 | 11.0 |
| Comparative Example 3 | 3.9 | 1.0 | 5.1 | 10.0 |
| Comparative Example 4 | 2.5 | 2.3 | 4.2 | 9.0 |
| Comparative Example 7 | 1.5 | 2.5 | 3.5 | 7.5 |
| Comparative Example 8 | 2.2 | 1.8 | 2.2 | 6.2 |
| Comparative Example 9 | 1.8 | 2.5 | 1.5 | 5.8 |
| Comparative Example 10 | 2.5 | 3.5 | 2.7 | 8.7 |
| Comparative Example 11 | 3.3 | 2.8 | 2.9 | 9.0 |
| Comparative Example 12 | 1.2 | 1.5 | 1.9 | 4.6 |
| Comparative Example 13 | 3.4 | 2.5 | 1.5 | 7.4 |
| Comparative Example 14 | 2.5 | 1.5 | 1.8 | 5.8 |
| Comparative Example 15 | 2.1 | 2.0 | 2.0 | 5.4 |
| Comparative Example 16 | 3.3 | 1.6 | 2.1 | 7.0 |
| Comparative Example 17 | 1.8 | 2.2 | 3.2 | 7.2 |
| Comparative Example 18 | 1.5 | 3.1 | 2.8 | 7.4 |

As a result, it was confirmed that in the cases where any one of three water-dispersible aromatic UV-blocking agents of phenylbenzimidazole sulfonic acid, terephthalylidene dicamphor sulfonic acid, and methylene bis-benzotriazolyl tetramethylbutylphenol (or tris-biphenyl triazine) is not included, or even any one of three water-dispersible aromatic UV-blocking agents is included in a small amount or in an excessive amount, when a surfactant is included, or an organic UV-blocking agent is included, or oil is included, compared to the disclosure (Examples), properties were deteriorated in terms of ease of application, uniformity of application, convenience of use.

Experimental Example 4

Skin Irritation Evaluation

A human patch test was conducted according to the guidelines for the evaluation of new cosmetic materials. A skin patch test was conducted, using the IQ Chamber, on a total of 33 test participants with an average age of 41±10 who agreed to participate in this human application test and satisfied the selection and exclusion criteria. 20 μl of each test material was dropped into the IQ Chamber. The patch was attached for 24 hours, and the degree of irritation was observed by two experts 1 hour after the patch was removed and 24 hours after the patch was removed, according to the criteria of the international contact dermatitis research group (ICDRG). As for the skin irritation index, 0.00-0.25 is non-irritating, 0.3-1.0 is mild irritation, 1.0-2.5 is moderate irritation, and 2.5-4.0 is strong irritation.

[How to calculate skin irritation index]

$$\text{Skin irritation index} = \frac{\text{Skin response degree}}{n(\text{Evaluation count})}$$

Skin response $$\text{degree} = \left[\left(\sum_{i=1}^{n} \text{Evaluation value}/n(\text{number of test participants})\right) 1hr + \left(\sum_{i=1}^{n} \text{Evaluation value}/n(\text{number of test participants})\right) 24hr\right.$$

TABLE 8

| Evaluation Target | Skin Irritation |
|---|---|
| Example 1 | 0.00 |
| Example 2 | 0.01 |
| Example 3 | 0.01 |
| Example 4 | 0.00 |
| Comparative Example 1 | 0.35 |
| Comparative Example 2 | 0.48 |
| Comparative Example 3 | 0.12 |
| Comparative Example 4 | 0.66 |
| Comparative Example 7 | 0.32 |
| Comparative Example 8 | 0.25 |
| Comparative Example 9 | 0.16 |
| Comparative Example 10 | 0.45 |
| Comparative Example 11 | 0.41 |
| Comparative Example 12 | 0.35 |
| Comparative Example 13 | 0.38 |
| Comparative Example 14 | 0.40 |
| Comparative Example 15 | 0.29 |
| Comparative Example 16 | 0.59 |
| Comparative Example 17 | 0.31 |
| Comparative Example 18 | 0.45 |

As a result, it was confirmed that in the cases where any one of three water-dispersible aromatic UV-blocking agents of phenylbenzimidazole sulfonic acid, terephthalylidene dicamphor sulfonic acid, and methylene bis-benzotriazolyl tetramethylbutylphenol (or tris-biphenyl triazine) is not included, or even any one of three water-dispersible aromatic UV-blocking agents is included in a small amount or in an excessive amount, when a surfactant is included, or an organic UV-blocking agent is included, or oil is included, compared to the disclosure (Examples), the skin irratation was high.

Experimental Example 5

Evaluation of Skin Moisture Retention

After applying the emulsions and lotions prepared according to the compositions of Examples 1 to 4 and Comparative Examples 1 to 4 and Comparative Examples 7 to 18, the change in transdermal water loss (TEWL) before and after the test was measured.

The measurement site for device evaluation was, to observe changes in the facial skin, a total of 3 sites including the forehead, right cheek, and right eye area, and, to observe changes in the neck skin, a total of 2 sites including a front neck and a side neck. The skin surface of each site was measured using the corresponding probe of the measuring device. The transdermal water loss (TEWL), which is a measure of the skin barrier recovery function, of each site was measured a total of 5 times, and then the measurement values were averaged. The average value of each item for the facial skin and the neck skin part was used as the final measurement value to measure the skin surface change.

TABLE 9

| Evaluation Target | Average value before application | Average value after application |
|---|---|---|
| Example 1 | 56.2 | 56.1 |
| Example 2 | 55.8 | 56.5 |
| Example 3 | 56.8 | 57.1 |
| Example 4 | 54.9 | 55.0 |
| Comparative Example 1 | 54.3 | 58.2 |
| Comparative Example 2 | 55.1 | 62.3 |
| Comparative Example 3 | 57.2 | 65.2 |
| Comparative Example 4 | 55.3 | 60.1 |
| Comparative Example 7 | 56.8 | 67.2 |
| Comparative Example 8 | 54.6 | 68.5 |
| Comparative Example 9 | 53.5 | 66.5 |
| Comparative Example 10 | 52.3 | 68.2 |
| Comparative Example 11 | 55.1 | 62.1 |
| Comparative Example 12 | 55.4 | 60.4 |
| Comparative Example 13 | 56.1 | 62.0 |
| Comparative Example 14 | 55.2 | 60.1 |
| Comparative Example 15 | 54.8 | 59.5 |
| Comparative Example 16 | 56.2 | 60.8 |
| Comparative Example 17 | 55.1 | 69.5 |
| Comparative Example 18 | 56.2 | 62.1 |

As a result, as shown in Table 9, the transdermal water loss (TEWL) of Examples 1 to 4 was significantly reduced or maintained similarly, whereas, as in Comparative Example 1 to Comparative Example 4 or Comparative Example 7 to Comparative Example 18, in the cases where any one of three water-dispersible aromatic UV-blocking agents of phenylbenzimidazole sulfonic acid, terephthalylidene dicamphor sulfonic acid, and methylene bis-benzotriazolyl tetramethylbutylphenol (or tris-biphenyl triazine) is not included, or even any one of three water-dispersible aromatic UV-blocking agents is included in a small amount or in an excessive amount, when a surfactant is included, or an organic UV-blocking agent is included, or oil is included, the amount of skin moisture loss showed the tendency to increase.

Experimental Example 6

Transparency Measurement

Transparency (degree of whiteness) was measured for the emulsions and lotions prepared according to the compositions of Example 1 to Example 4, Comparative Example 1 to Comparative Example 4, and Comparative Example 7 to 18. Each composition was spread thinly using an applicator (30 μm), and then, placed on the black surface for measuring the hiding rate (L:24.27, a:−20.20, b:−0.43), and then the transparency thereof was measured using a color meter. The transparencies of the respective compositions were compared.

Figure 2:
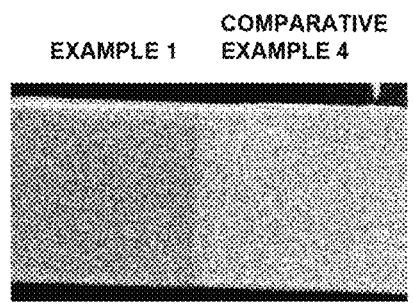
FIG. 2 show images showing the transparency of Example 1 and Comparative Example 4.

Each comparative composition was spread thinly using an applicator (30 μm), and then, placed on the black surface for measuring the hiding rate (L:24.27, a:−20.20, b:−0.43), and then the degree of whiteness thereof was measured using a color meter. The degrees of whiteness of the respective compositions were compared. The experimental results are shown in Table 10 and FIGS. 1 and 2.

Lab is an internationally standardized color system standardized by colmmission internationaled' eclarirage (CIE). The L value refers to the lightness, which is the degree of light and dark. The a value indicates the relationship between green and red. When the value goes to a negative number, it is green, and when the value goes to a positive number, it is red. The value b indicates a relationship between blue and yellow. When the value goes to a negative number, it is blue, and when the value goes to a positive number, it is yellow. Here, the larger the L value, the greater the degree of cloudiness, indicating that the black surface of the background appears closer to white.

TABLE 10

| Evaluation Target | L | a | b |
|---|---|---|---|
| Example 1 | 40.36 | +0.11 | −5.90 |
| Example 2 | 45.70 | +0.76 | −9.29 |
| Example 3 | 46.12 | +0.67 | −9.80 |
| Example 4 | 40.12 | +0.12 | −4.99 |
| Comparative Example 1 | 58.22 | +0.51 | −9.45 |
| Comparative Example 2 | 61.22 | +0.65 | −10.21 |
| Comparative Example 3 | 53.22 | +0.53 | −9.12 |
| Comparative Example 4 | 61.12 | +0.56 | −9.44 |
| Comparative Example 7 | 61.02 | +0.43 | −9.52 |
| Comparative Example 8 | 71.12 | +0.66 | −9.84 |
| Comparative Example 9 | 56.11 | +0.69 | −9.71 |
| Comparative Example 10 | 56.02 | +0.40 | −10.52 |
| Comparative Example 11 | 61.12 | +0.56 | −9.54 |
| Comparative Example 12 | 66.15 | +0.49 | −9.11 |
| Comparative Example 13 | 60.52 | +0.56 | −10.51 |
| Comparative Example 14 | 59.56 | +0.59 | −10.12 |
| Comparative Example 15 | 61.21 | +0.61 | −9.89 |
| Comparative Example 16 | 60.55 | +0.51 | −9.44 |
| Comparative Example 17 | 58.45 | +0.49 | −8.94 |
| Comparative Example 18 | 55.51 | +0.51 | −9.15 |

As a result, it was confirmed that in the cases where any one of three water-dispersible aromatic UV-blocking agents of phenylbenzimidazole sulfonic acid, terephthalylidene dicamphor sulfonic acid, and methylene bis-benzotriazolyl tetramethylbutylphenol (or tris-biphenyl triazine) is not included, or even any one of three water-dispersible aromatic UV-blocking agents is included in a small amount or in an excessive amount, when a surfactant is included or an organic UV-blocking agent is included, the transparency tended to decrease, especially compared to the case as in Comparative Example 4 and Comparative Example 7 where the emulsion type containing oil was used, the transparency tended to be decreased more.

The invention claimed is:

1. An ultraviolet (UV)-blocking cosmetic composition which is dispersed in water and is free of oil, the composition comprising
a UV-blocking agent which is dispersed in water, is free of oil, and comprises three different types of water-dispersible aromatic UV-blocking agents, wherein
the three different types of water-dispersible aromatic UV-blocking agents comprise a first UV-blocking agent, a second UV-blocking agent, and a third UV-blocking agent, wherein
the first UV-blocking agent includes phenylbenzimidazole sulfonic acid,
the second UV-blocking agent includes terephthalylidene dicamphor sulfonic acid, and
the third UV-blocking agent includes methylene bis-benzotriazolyl tetramethylbutylphenol or tris-biphenyl triazine,
and the composition dose not comprise ethylhexyltriazone, wherein
the first UV-blocking agent is included in an amount of 1.5 wt % to 3.5 wt % based on the total weight of the composition,
the second UV-blocking agent is included in an amount of 6.5 wt % to 9.5 wt % based on the total weight of the composition, and
the third UV-blocking agent is included in an amount of 2 wt % to 9 wt % based on the total weight of the composition.

2. The UV-blocking cosmetic composition of claim 1, wherein the composition comprises at least one of a thickener, a polyol, water, and a pH adjusting agent.

3. The UV-blocking cosmetic composition of claim 2, wherein
the thickener comprises at least one of a carbomer and an acrylate/$C_{10-30}$ alkyl acrylate crosspolymer,
the polyol includes at least one of propanediol and hexanediol, and
the pH adjusting agent includes tromethamine.

4. The UV-blocking cosmetic composition of claim 2, wherein
the thickener is included in an amount of 0.5 wt % to 1 wt % based on the total weight of the composition,
the polyol is included in an amount of 10 wt % to 20 wt % based on the total weight of the composition, and
the water is included in the balance amount.

5. A method of preparing the ultraviolet (UV)-blocking cosmetic composition which is dispersed in water and is free of oil of claim 1,
the method comprising mixing:
a first phase comprising methylene bis-benzotriazole tetramethylbutylphenol or tris-biphenyl triazine;
a second phase comprising phenylbenzimidazole sulfonic acid; and
a third phase comprising terephthalylidene dicamphor sulfonic acid.

6. The method of claim 5, wherein
the first phase includes: a polyol; a thickener; methylene bis-benzotriazolyl tetramethylbutylphenol or tris-biphenyl triazine; and water,
the second phase includes: a pH adjusting agent; water; and phenylbenzimidazole sulfonic acid, and
the third phase includes: a pH adjusting agent; water; and terephthalylidene dicamphor sulfonic acid.

7. The method of claim 5, wherein the mixing comprises
a first mixing of mixing the first phase with the second phase; and
a second mixing of mixing, with the third phase, a mixture including the first phase and the second phase.

8. The method of claim 7, wherein the first mixing comprises adding a pH adjusting agent to the first phase, followed by mixing with the second phase.

9. The method of claim 7, wherein the second mixing comprises mixing a mixture including the first phase and the second phase with a polyol, followed by mixing with the third phase.

* * * * *